United States Patent
Liu

[11] Patent Number: 5,999,871
[45] Date of Patent: Dec. 7, 1999

[54] CONTROL METHOD FOR VARIABLE LEVEL AIRBAG INFLATION

[75] Inventor: Jiyao Liu, Kokomo, Ind.

[73] Assignee: Delphi Technologies, Inc., Troy, Mich.

[21] Appl. No.: 08/695,814

[22] Filed: Aug. 5, 1996

[51] Int. Cl.$^6$ ................................................. B60R 21/14
[52] U.S. Cl. ........................... 701/45; 701/46; 280/731; 280/732
[58] Field of Search ..................... 701/45, 46, 47; 280/738, 742, 735, 730.1, 731, 732, 736; 180/271, 272, 273, 282

[56] References Cited

U.S. PATENT DOCUMENTS

| | | | |
|---|---|---|---|
| 3,874,695 | 4/1975 | Abe et al. | 280/150 |
| 3,966,224 | 6/1976 | Campbell et al. | 280/735 |
| 5,074,583 | 12/1991 | Fujita et al. | 280/735 |
| 5,375,875 | 12/1994 | DiSalvo et al. | 280/728 B |
| 5,398,966 | 3/1995 | Hock | 280/736 |
| 5,400,487 | 3/1995 | Gioutsos et al. | 280/735 |
| 5,411,289 | 5/1995 | Smith et al. | 280/735 |

FOREIGN PATENT DOCUMENTS

| | | | |
|---|---|---|---|
| 40 41 049 A1 | 2/1992 | Germany | B60R 21/16 |
| 40 41 049 | 7/1992 | Germany | B60R 21/16 |
| WO 91/13784 | 9/1991 | WIPO | B60R 21/32 |
| WO95/11819 | 5/1995 | WIPO | B60R 21/32 |

*Primary Examiner*—William A. Cuchlinski, Jr.
*Assistant Examiner*—Arthur D. Donnelly
*Attorney, Agent, or Firm*—Jimmy L. Funke

[57] ABSTRACT

An airbag with two or more inflators can be inflated in successive stages separated by a time interval, inflated simultaneously or some not inflated at all, depending on crash severity. The first stage inflation is controlled in accordance with a conventional algorithm for single stage deployment. Deployment time and velocity parameters used for the first stage are employed to determine the crash severity and the time interval of the next stage. There is no time delay in the case of a very severe crash, but for a moderately severe crash the time interval is proportional to the difference of the time or velocity and a selected minimum time or velocity value.

13 Claims, 2 Drawing Sheets

5,999,871

CONTROL METHOD FOR VARIABLE LEVEL AIRBAG INFLATION

FIELD OF THE INVENTION

This invention relates to an automotive supplemental restraint system having multi-stage inflation and particularly to a control method to triggering inflation of each stage.

BACKGROUND OF THE INVENTION

To afford occupant protection in motor vehicles it is a common practice to provide air bags which are quickly inflated, when a crash is sensed by an accelerometer and associated controller. Such controllers are able to measure the severity of the crash and the velocity change by analyzing the acceleration so that the airbag inflation is optimally timed. Typically the airbag is deployed by firing a pyrotechnic device which releases or produces gas for inflation at a fixed rate, so that deployment is the same for every type of crash, except for the timing. Further improvement in the deployment can be made by controlling the rate of deployment over time. One way of accomplishing this is by multilevel inflation or variable level inflation.

It has been proposed to include two or more inflators in an airbag and to inflate the airbag in stages by triggering inflators in succession. An optimum control for each inflation is desired.

SUMMARY OF THE INVENTION

It is therefore an object of the invention to control the firing of multiple airbag inflators to optimize the effect of the airbag for each type of crash at different impact speeds.

The invention is carried out by triggering the first one of the inflators by a conventional control algorithm which evaluates the severity of the crash to determine whether to deploy the airbag and when to fire the inflator. In the course of this determination the controller detects when the acceleration reaches a threshold, then invokes the deployment algorithm which calculates a deployment time and the velocity change at the deployment time determined by integrating the acceleration. The algorithm for the second stage then evaluates severity of the crash on the basis of the deployment time and velocity at the deployment time. In the case of a very severe crash the second inflator is fired immediately. For a moderately severe crash the second inflator is fired after a time delay; the delay is a function of the first stage deployment time and/or the velocity at the first stage deployment time. For a less severe crash the second inflator is not fired at all. If the system has an additional inflator, the same logic is used to determine its firing based on the deployment time of the second inflator and the velocity at that time. In other words, the system re-determines crash severity as of the time of the inflating of the second stage, and deploys the additional inflator when justified by the re-determined crash severity.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
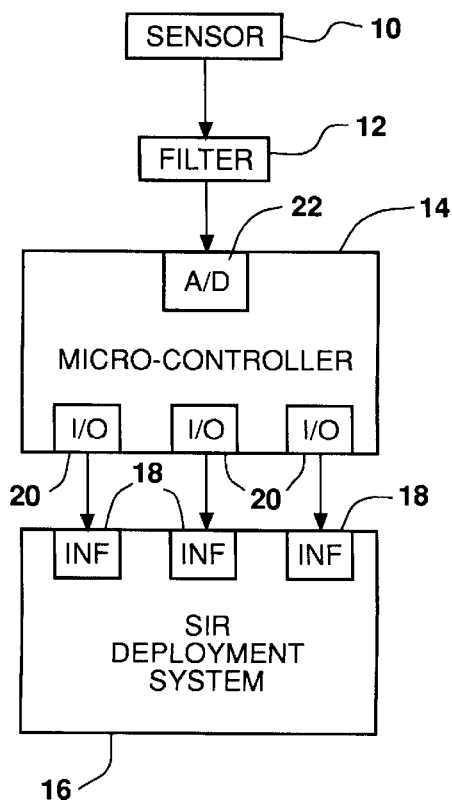
FIG. 1 is a schematic diagram of a supplemental restraint system with multi-stage inflation.

FIG. 1 shows a supplemental inflatable restraint (SIR) system comprising an accelerometer or sensor 10, a hardware low-pass filter 12, a micro-controller 14, and a SIR deployment system 16. The elements 10–14 may be generally conventional, except for the functionality of the micro-controller 14 under the direction of the control software described herein.

The deployment system 16, however, has a plurality of inflators 18 which are controlled by the micro-controller 14 to inflate the airbag in stages, or simultaneously, or perhaps only one or two are inflated, depending on the crash severity. Each inflator, when fired produces sufficient gas to partially inflate the air bag and all the inflators together can produce the amount of gas equivalent to a conventional single stage inflator. If, for example, two inflators are provided, the first one to inflate may produce 60% to 80% of the gas for complete inflation and the second inflator, if used, supplies the remainder. Thus a partially or fully inflated airbag can be deployed immediately, or full inflation is attained over a longer time period by deployment in two successive stages. Each inflator 18 is coupled to an I/O port 20 of the micro-controller.

The accelerometer 10 provides an analog electrical signal corresponding to the acceleration along the longitudinal axis of the vehicle. The acceleration signal is supplied to the filter 12 to form a filtered acceleration signal which is applied as an input to an A/D port 22 of the micro-controller for analysis according to this invention and further according to previously known SIR methods. In addition to the I/O ports 20 and the A/D port 22, the micro-controller 14 comprises conventional electronic componentry, including a microprocessor and random access and read-only memories.

Conventional single stage inflation controllers initiate a deployment algorithm when the filtered acceleration signal reaches a threshold. The algorithm processes the acceleration signal to determine whether to deploy and calculates the velocity $V_D$ of a vehicle occupant relative to the vehicle at deployment and the time $T_D$ of deployment measured from the threshold crossing. These two parameters are well known in the art and are generally available in conventional SIR systems of various manufacturers. These parameters will be used in a subsequent stage to determine crash severity and then whether to deploy another stage and when to do it.

Figure 2:
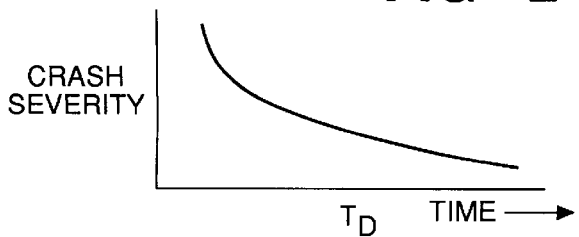
FIGS. 2 and 3 are graphs of deployment time and velocity vs. crash severity.
Figure 3:
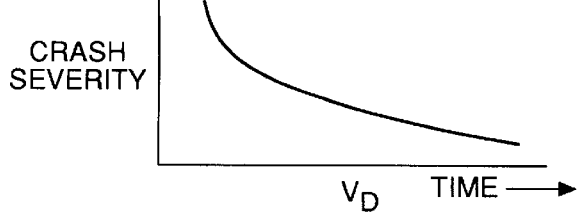
Figure 4:
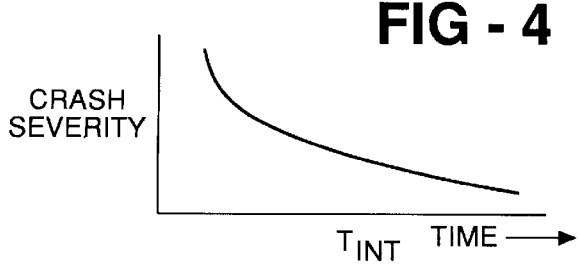
FIG. 4 is a graph of time interval between deployments vs. crash severity, according to the invention.

As indicated in FIGS. 2 and 3, the parameters $T_D$ and $V_D$ are generally small values for very severe crashes. They are small since a more severe crash should result in earlier deployment, and the short period gives less time for the accumulation of velocity. Thus these parameters are suitable candidates for crash severity indicators. Thus they can be used to determine the interval $T_{INT}$ between the first and second inflators (and between each stage and the next one). It is reasonable to choose a short time interval for more severe crashes and a longer interval for less severe crashes as shown in FIG. 4. It has been found that for the most severe cases the time interval $T_{INT}$ should be zero so that the second inflation is triggered immediately. On the other hand, when the crash is not severe the second (or subsequent) inflation should not occur at all. For the intermediate case of moderate crash severity, the time interval should be varied as a function of severity.

Figure 5:
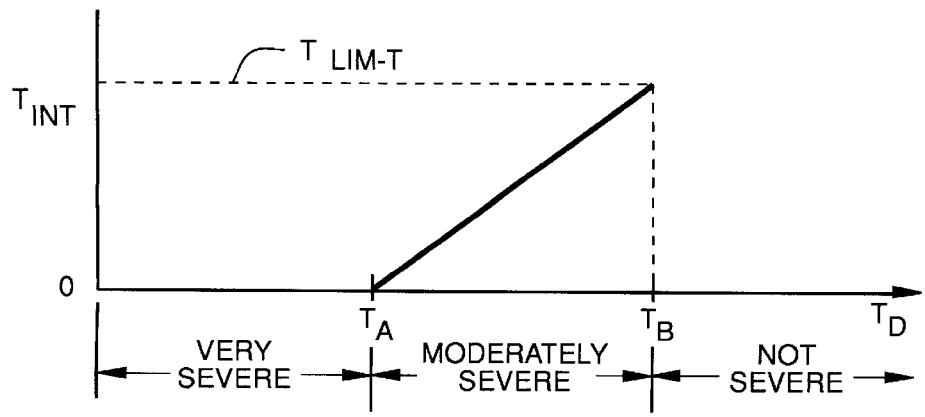
FIG. 5 is a graph of the time interval for subsequent deployment vs. the first stage inflation triggering time, according to the invention.
Figure 6:
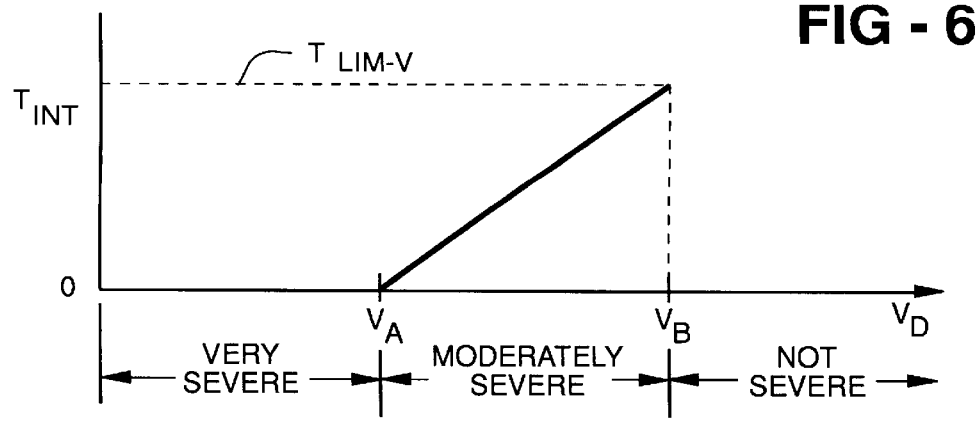
FIG. 6 is a graph of the time interval for subsequent deployment vs. the first stage inflation triggering time, according to the invention.

FIG. 5 shows the example of $T_{INT}$ for the three regions of crash severity. A deployment time threshold $T_A$ defining a crash severity limit is empirically determined and marks the boundary of very severe and moderately severe crashes; a time $T_B$ is determined as the boundary of moderate and not severe crashes. It has been found to be desirable to deploy the second inflator immediately after the first when $T_D$ is less than time threshold $T_A$ so that $T_{INT}$ is set to zero. For deployment times between $T_A$ and $T_B$, however, the time interval $T_{INT}$ increases with $T_D$. A linear or proportional function is chosen for simplicity although another increasing function may be used. Thus the time interval increases from 0 at $T_A$ to an empirical limit $T_{LIM\_T}$ at $T_B$ which sets the maximum allow delay between the first and second deployment times. For deployment times greater than $T_B$, the crash is not severe and there is no deployment of the second inflator. A similar function is shown in FIG. 6 for the time interval $T_{INT}$ as a function of velocity $V_D$. Boundary points $V_A$ and $V_B$ are empirically chosen to define the three severity regions and a time limit $T_{LIM\_V}$ is determined.

Figure 7:
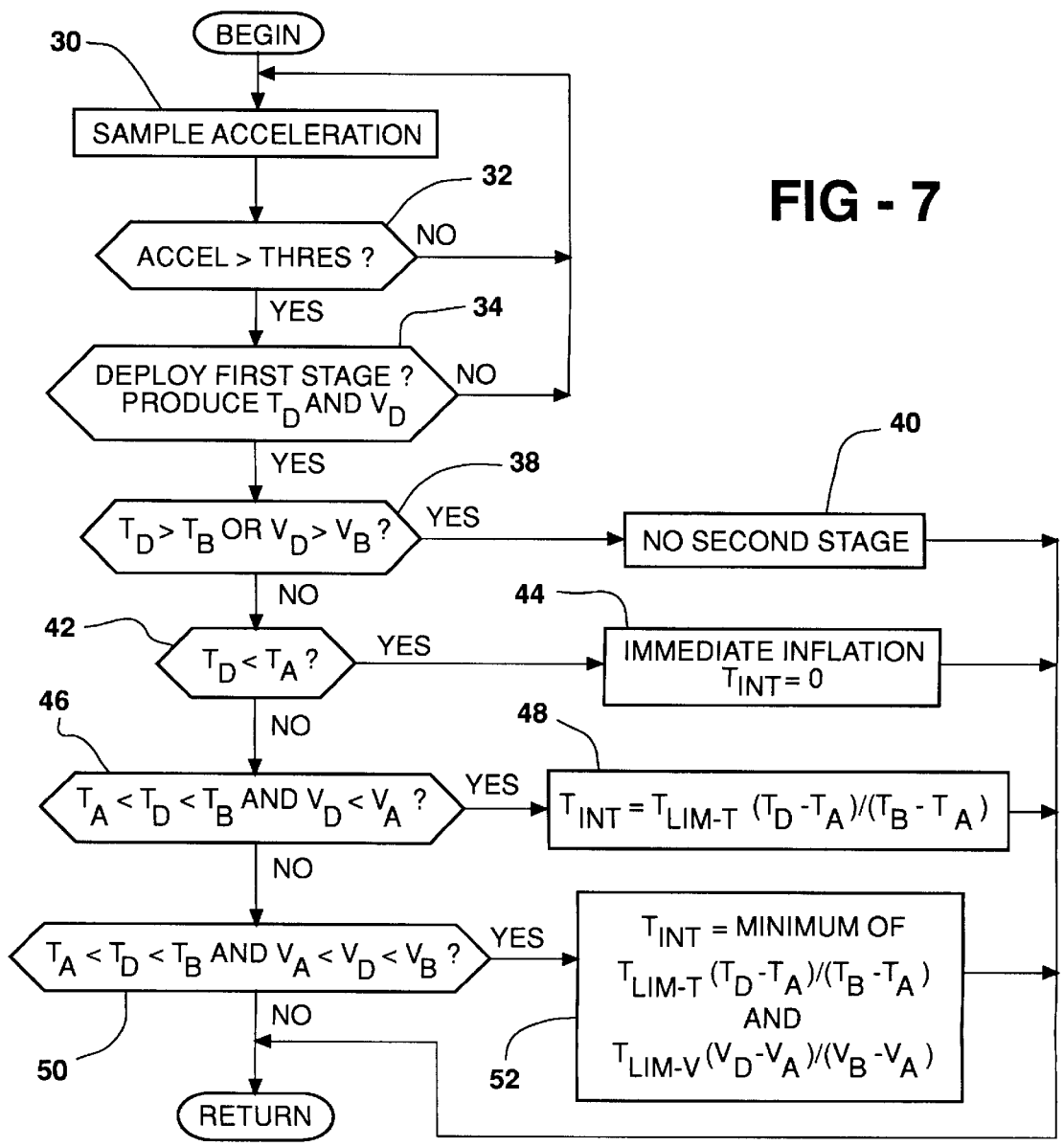
FIG. 7 is a flow chart representing an algorithm for determining time interval for subsequent deployment according to the invention.

The algorithm for determining the time interval between the first and second inflator deployments is shown in the flow chart of FIG. 7 wherein the functional description of each block in the chart is accompanied by a number in angle brackets <nn> which corresponds to the reference number of the block. The micro-controller is programmed to process the software loop periodically, say at a rate of 1600 to 2000 Hz, to repeatedly sample the acceleration signal produced by the sensor <30>. If it is determined that the acceleration exceeds a threshold <32> a deployment algorithm is entered to determine if first stage deployment is justified <34>. At the same time, the parameters $T_D$ and $V_D$ are produced if a decision is made to deploy the airbag. Thus far the methodology is exactly the same as conventional algorithms for single stage systems. Then if the first stage is commanded to be deployed, the parameters $T_D$ and $V_D$ are used to determine when, if ever, to trigger the second stage inflator. If the deployment time is greater than the value $T_B$ or if the velocity at that time is greater than $V_B$ <38>, the crash is not severe and the second stage inflation is withheld <40>. As a result, the airbag is softer than if it were fully inflated but is adequate for the less severe crash. If the step 38 conditions are not met, it is next determined if the deployment time is less than the threshold value $T_A$ <42> and if so the time interval is set to zero for immediate inflation <44> because the crash is very severe and the airbag is fully inflated, just as it is in a single stage system. If the step 42 condition is not true, it is next determined whether the deployment time is between $T_A$ and $T_B$ AND the velocity is less than $V_A$ <46>. If so, the time interval is calculated to be proportional to the difference between the value $T_A$ and the parameter $T_D$, or $T_{INT}=T_{LIM\_T}*(T_D-T_A)/(T_B-T_A)$ <48>. If the condition of step 46 is not met, then it is determined if the deployment time is between $T_A$ and $T_B$ AND the velocity is between $V_A$ and $V_B$ <50>. If so, the time interval is selected to the smaller of the values $T_{LIM\_T}*(T_D-T_A)/(T_B-T_A)$ and $T_{LIM\_V}*(V_D-V_A)/(V_B-V_A)$ <52>.

By including a conventional SIR algorithm as the initial part of the multi-stage control algorithm the ability to discriminate a crash in a timely manner with immunity to rough road and other abuse events is preserved. In addition, parameters developed within the initial crash sensing algorithm are employed in determining deployment of a subsequent stage, thereby economizing on the processing burden. It will thus be seen that the control for two or more additional stages is effected simply without additional SIR hardware and only minimal software. The effect of the algorithm is to maintain the rapid full inflation of an air bag for severe crashes but to provide a softer or more slowly inflating airbag for less severe conditions.

The embodiments of the invention in which an exclusive property or privilege is claimed are defined as follows:

1. A method of controlling deployment of multiple stages of a vehicle inflatable restraint comprising the steps of:

sensing vehicle acceleration;

initiating a deployment algorithm for a first stage of the restraint when the sensed acceleration exceeds a threshold, and if such deployment algorithm determines that the first stave should be deployed:

producing at least one first stage deployment parameter including a deployment time between the initiation of said deployment algorithm and the deployment of said first stage;

comparing the produced first stage deployment parameter to predetermined thresholds to determine crash severity; and determining if and when to deploy a second stage of the restraint based on the determined crash severity.

2. The method as defined in claim 1 wherein if it is determined that the second stage of the restraint should be deployed the method includes the steps of:

producing a second stage deployment parameter including a secondary deployment time between the initiation of said deployment algorithm and the deployment of said second stage;

comparing the produced second stage deployment parameter to predetermined thresholds to re-determine crash severity as of the time of deployment of the second stage; and determining if and when to deploy a third stage of the restraint based on the re-determined crash severity.

3. The method as defined in claim 1 wherein the produced first stage deployment parameter includes the deployment time, and the method includes the steps of:

establishing a deployment time threshold defining a crash severity limit;

comparing the deployment time to the established threshold; and determining that the second stage of the restraint should be deployed immediately if the deployment time is below the established threshold.

4. The method as defined in claim 1 wherein the produced first stage deployment parameter includes the deployment time, and the method includes the steps of:

establishing first and second deployment time thresholds defining crash severity limits;

comparing the deployment time to the first and second thresholds;

determining that the second stage should be deployed:
immediately if the deployment time is below the first thresholds and
after a delay if the deployment time is between the first and second thresholds; and
determining that the second stage should not be deployed if the deployment time is greater than the second threshold.

5. The method as defined in claim 4 wherein the delay is proportional in duration to a difference between the first threshold and the deployment time.

6. A method of controlling deployment of multiple stages of a vehicle inflatable restraint comprising the steps of:

sensing vehicle acceleration;

initiating a deployment algorithm for a first stage of the restraint when the sensed acceleration exceeds a threshold, and if such deployment algorithm determines that the first stage should be deployed:

producing a first stabe deployment time $T_D$ corresponding to a time between initiation of said deployment algorithm and deployment of the first stage, and a first stage velocity $V_D$ corresponding to a change in vehicle velocity at the deployment of said first stage;

establishing first and second time thresholds $T_A$ and $T_B$ with $T_A<T_B$, and first and second velocity thresholds $V_A$ and $V_B$ with $V_A<V_B$;

comparing the deployment time $T_D$ to the thresholds $T_A$ and $T_B$, and comparing the velocity $V_D$ to the thresholds $V_A$ and $V_B$ to determine crash severity; and determining if and when to deploy a second stage of the restraint based on the determined crash severity.

7. The method as defined in claim 6 wherein the step of determining if and when to deploy the second stage of the restraint includes the step of:

determining to not deploy the second stage if either $T_D>T_B$ or $V_D>V_B$ thereby indicating that the crash is not severe.

8. The method as defined in claim 6 wherein the step of determining if and when to deploy the second stage of the restraint includes the step of:

determining to deploy the second stage immediately if $T_D<T_A$ thereby indicating that the crash is very severe.

9. The method as defined in claim 6 wherein the step of determining if and when to deploy the second stage of the restraint includes the step of:

determining to deploy the second stage after a time delay if $T_A<T_D<T_B$ and $V_D<V_A$, thereby indicating that the crash is moderately severe.

10. The method as defined in claim 9 wherein the time delay is proportional to $T_D-T_A$.

11. The method as defined in claim 9 wherein the time delay is determined by $T_{LIM\_T}*(T_D-T_A)/(T_B-T_A)$ where $T_{LIM\_T}$ is an empirically determined maximum delay time value.

12. The method as defined in claim 6 wherein the step of determining if and when to deploy the second stage of the restraint includes the step of:

determining to deploy the second stage after a time delay when $T_A<T_D<T_B$ and $V_A<V_D<V_B$, thereby indicating that the crash is moderately severe.

13. The method as defined in claim 12 wherein the time delay is determined by the smaller value of $T_{LIM\_T}*(T_D-T_A)/(T_B-T_A)$ or $T_{LIMV}*(V_D-V_A)/(V_B-V_A)$ where $T_{LIM\_T}$ and $T_{LIM\_V}$ are empirically determined maximum delay time values.

* * * * *